United States Patent [19]

Temme et al.

[11] Patent Number: 4,600,097
[45] Date of Patent: Jul. 15, 1986

[54] SCRAPER UNITS FOR MINE CONVEYOR SCRAPER-CHAIN ASSEMBLIES

[75] Inventors: Helmut Temme, Waltrop; Karl-Heinz Wrobbel, Hagen, both of Fed. Rep. of Germany

[73] Assignees: Gewerschaft Eisenhutte Westfalia; Hammerwerke Haspe Gebruder Kettler, both of Fed. Rep. of Germany

[21] Appl. No.: 570,898

[22] Filed: Jan. 16, 1984

[30] Foreign Application Priority Data

Jan. 20, 1983 [DE] Fed. Rep. of Germany ....... 3301685

[51] Int. Cl.4 ............................................. B65G 19/24
[52] U.S. Cl. ................................................... 198/731
[58] Field of Search ................ 198/731, 733, 648, 712

[56] References Cited

U.S. PATENT DOCUMENTS 4,105,110 8/1978 Braun et al. .......................... 198/731
4,320,827 3/1982 Puppel et al. ........................ 198/731

FOREIGN PATENT DOCUMENTS 1815839 12/1968 Fed. Rep. of Germany ...... 198/731
2102207 8/1972 Fed. Rep. of Germany ...... 198/731
2160027 7/1979 Fed. Rep. of Germany ...... 198/731
0454781 10/1936 United Kingdom ................ 198/731
0864296 3/1961 United Kingdom ................ 198/731
1279177 6/1972 United Kingdom ................ 198/731

Primary Examiner—Joseph E. Valenza
Assistant Examiner—Lyle Kim
Attorney, Agent, or Firm—Thompson, Birch, Gauthier and Samuels

[57] ABSTRACT

A scraper unit for a scraper-chain assembly is composed of a scraper bar which locates with a pair of coupling pieces at each of its ends. The coupling pieces trap chain links therebetween. The bar has pockets underneath its end regions which locate with the lowermost coupling pieces and recesses open from above which locate with the uppermost coupling pieces. Threaded pins which receive nuts are provided on the lower coupling pieces to engage through bores in the upper coupling pieces and the scraper bar end regions.

10 Claims, 5 Drawing Figures

SCRAPER UNITS FOR MINE CONVEYOR SCRAPER-CHAIN ASSEMBLIES

FIELD OF THE INVENTION

The present invention relates, in general, to scraper-chain assemblies for use in scraper-chain conveyors and, more particularly, to scraper units therefor.

BACKGROUND TO THE INVENTION

Scraper-chain assemblies of various designs are well known in the art. The present invention is mainly concerned with the so-called double chain assembly where spaced-apart scrapers are mounted between a pair of widely spaced oval link chains. In order to connect the scrapers to the chains various types of connectors have been employed. German patent specification No. 3021922—which has an equivalent GB No. 2077215A—describes a scraper unit which has a scraper bar with end regions which overlie horizontal links of the chains. Coupling pieces then locate beneath the chain links and clamp the bar to the links. The coupling pieces fit into internal pockets in the bar and screw-threaded pins and nuts and bolts serve to lock the components together for easy detachment. The end regions of the scraper bar tend to suffer heavy wear and the entire scraper bar has to be replaced from time to time.

A general object of the present invention is to provide an improved scraper unit.

SUMMARY OF THE INVENTION

The present invention provides a scraper unit for a scraper-chain assembly which is composed of a scraper with end regions provided with pockets accessible from the undersides thereof. Separate lower coupling pieces locate generally beneath these end regions and engage in the pockets. These coupling pieces are shaped, primarily on their upper surfaces, to receive and seat thereon horizontal links of a pair of chains of the assembly. The coupling pieces also have upstanding projections conveniently screw-threaded. In accordance with the invention, additional upper coupling pieces locate over the lower coupling pieces and are similarly shaped on the undersurfaces to receive and seat onto the aforementioned links. The upper coupling pieces have apertures or bores which receive the upstanding projections of the lower coupling pieces. The end regions of the scraper also have bores which align with some of the bores in the upper coupling pieces thereby to receive some of the projections. The end regions of the scraper also have shaped recesses which receive the upper coupling pieces in shape-locked manner. These shaped recesses are accessible from the upper sides of the end regions and are conveniently open in the forward conveying direction and in a rear direction. Conveniently a web or similar wall on each end region can define the base of the upper shaped recess and the upper zone of the associated pocket. These webs may have stepped lateral shoulders which receive ribs of the upper coupling pieces. By providing enlarged counterbores in the upper coupling pieces which adjoin the bores therein nuts can be fitted onto the projections and used to clamp the components together.

With a scraper unit constructed in accordance with the invention the upper coupling pieces can easily be replaced after undue wear and the scraper need not be replaced in its entirety. Although it is known to construct wearing parts of a scraper unit for replacement, see for example German Gebrauchsmusters Nos. 1991468 and 7029635 and German patent specification No. 2119499, the scrapers in these constructions are not able to withstand the heavy loads usually encountered in modern mineral winning installations.

The shape-locking of the coupling pieces with the scraper in accordance with the invention provides a particularly stable structure and by making the components as robust one-piece drop forgings the unit is particularly well adapted for modern conveyors.

The shaped recesses and the upper coupling pieces may have inter-engaging inclined faces e.g. trapezoidal in plan view and inclined from the vertical. The end regions of the scraper may also have bevelled end faces which lie against complementary faces of the lower coupling pieces.

The invention may be understood more readily, and various other features of the invention may become apparent, from consideration of the following description.

BRIEF DESCRIPTION OF DRAWINGS

An embodiment of the invention will now be described, by way of example only, with reference to the accompanying drawings, wherein.

DESCRIPTION OF PREFERRED EMBODIMENT

Figure 1:
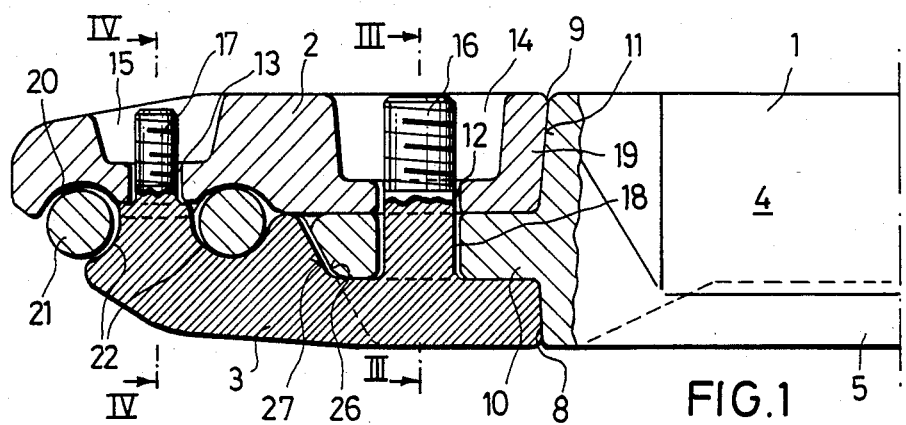
FIG. 1 is a part-sectional front elevation of an end region of a scraper unit constructed in accordance with the invention.

The single scraper unit partly depicted in the accompanying drawings is intended for use in double-side chain scraper-chain conveyors. A series of such units would be spaced apart along the chains to form therewith a scraper-chain assembly which is moved along the pans of the conveyor to transport material, especially mineral ores and coal. As shown in the drawings, the scraper unit as represented is composed of an integral, one-piece, elongate scraper bar 1 which is conveniently manufactured as a drop-forging. Detachable locking devices or coupling pieces 2, 3 which are separate to the bar 1 complete the unit. The coupling pieces 2,3 serve to clamp the bar 1 to the chains.

The bar 1 is formed with an inclined front face 4 which extends downwardly from an upper surface 6 of the bar 1 to merge with a substantially upstanding face 5 which forms the forward scraping surface of the unit. At the rear of the bar 1 there is a substantially upstanding face 7.

Figure 2:
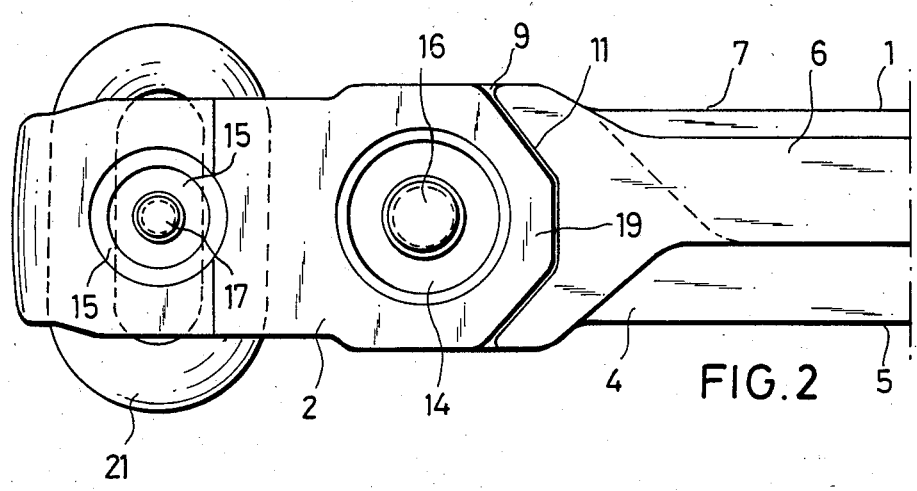
FIG. 2 is a plan view of the part of the scraper unit shown in FIG. 1.
Figure 3:
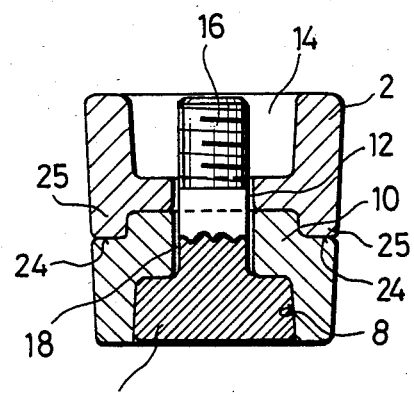
FIG. 3 is a sectional end view taken along the line III—III of FIG. 1.
Figure 4:
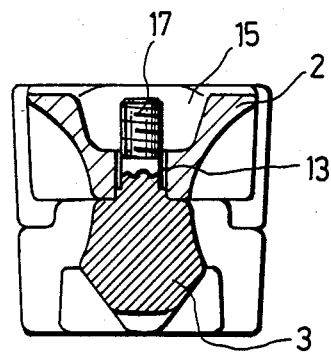
FIG. 4 is a sectional end view taken along the line IV—IV of FIG. 1.

At each end region of the bar 1 there is a flange-like protecting web or wall 10. At the underside of each wall 10 there is a pocket 8. As shown in FIGS. 1 and 3, the pocket 8 is open from underneath the bar 1 and closed with wall portions at the sides and rear. The pockets 8 serve to receive complementary parts of the lower coupling pieces 3 and as shown in FIG. 3 each coupling piece 3 is shaped to fit snugly into the associated pocket 8. Above each projecting wall 10 there is a recess 9 which is shaped inwardly, e.g. as shown in FIG. 2, to receive part of the upper coupling piece 2 which has a similar shaping at its inner end. The recesses 9 are open towards the sides of the scraper bar 1. As depicted in FIG. 2, each recess 9 and the end part of the corresponding coupling piece 2 have a somewhat trapezoidal profile in plan view designated 11 and 19 respectively. The engaging faces of the recesses 9 and the coupling pieces 2 are also inclined to the vertical as shown in FIG. 1.

Figure 5:
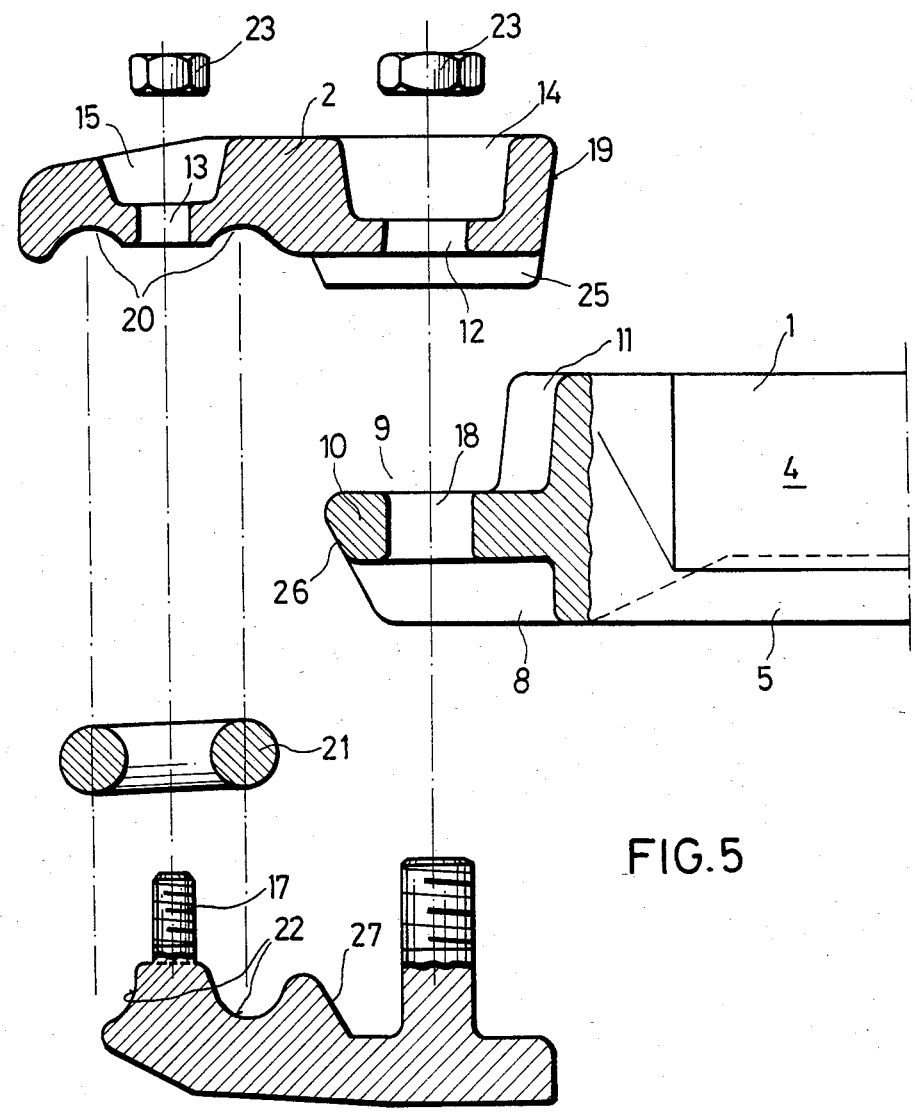
FIG. 5 is a diagrammatic, part-sectional, exploded front view of the end region of the scraper unit shown in FIG. 1.

As shown in FIG. 3, the projecting walls 10 of the bar 1 are provided with lateral recesses forming stepped shoulders 24. On their lower faces the coupling pieces 2 have complementary ribs 25 which engage in the recesses of the stepped shoulders 24. As also shown in FIGS. 1 and 5, the end faces 26 of the projecting walls 10 are bevelled and the coupling pieces 3 have complementary bevelled end faces 27 which engage against these end faces 26. The faces 26, 27 incline in the opposite direction to those of the recesses 9 and the coupling pieces 2.

The coupling pieces 2, 3 may be forged or cast components.

Each coupling piece 2 has through-bores 12, 13 which communicate within larger recesses 14, 15 open from the upper side of the coupling piece 2. Each lower coupling piece 3 has upwardly extending projections or pins 16, 17 which are screw-threaded. Nuts 23, shown in FIG. 5, engage onto the threaded shanks of the pins 16, 17 to clamp the coupling pieces 2, 3 to the bar and to one another. The walls 10 of the scraper bar 1 are provided with through bores 18 which receive the pins 16 in common with the bores 12 in the upper coupling pieces 2 aligned therewith. The pins 17 are received directly by the bores 13 in the upper coupling pieces 2.

The underside of each of the coupling pieces 2 is provided with a pair of shallow curvilinear recesses 20 and the lower coupling piece 3 is provided with similar recesses 22. The recesses 20, 22 combine to engage with a horizontal chain link 21 of one of the chains associated with the unit and the pin 17 of the lower coupling piece 3 extends through the link 21. Thus, when assembled as depicted in the drawings, each coupling piece 3 is arranged with the pins 16, 17 extending through the bores 18, 12, 13 with the chain link 21 seated and located by the recesses 20, 22.

During assembly the lower coupling pieces 3 can firstly be introduced beneath the chosen links 21 of the chains to cause the links to become seated on the beds provided by the recesses 22 with the pins 17 projecting through the links 21. The bar 1 can then be introduced from above to cause the pockets 8 to locate with the associated parts of the coupling pieces 3 and the pins 16 to project through the bores 18. The upper coupling pieces 2 are next fitted to bring the pins 17, 16 through the bores 12, 13 and the shaped regions 11, 19 together. Finally the nuts 23 are engaged on the pins 16, 17 to clamp the arrangement together and trap the links 21.

The various shaped-locked regions of the arrangement which supplement the screw-threaded connections provide good stability and strength while permitting some flexability. The unit can be disassembled by loosening and removing the nuts 23 and when any of the components becomes worn it can be replaced without difficulty.

We claim:

1. A scraper unit for a scraper-chain assembly of a conveyor; said unit comprising an elongated scraper with end regions each provided with a web wall extending generally longitudinally of the scraper, a bore extending through said web wall, a pocket accessible from the underside of the end region and at least one generally upstanding flank surface defining a shaped recess adjacent the web wall and accessible from the upperside of the end region; upper coupling pieces disposed above the end regions of the scraper; each upper coupling piece being shaped to engage in the shaped recess of the associated scraper end region, the upper coupling pieces and the web walls of the scraper end regions having additional interengaging projections and recesses offset transversally of the horizontal axis of the scraper, each upper coupling piece having first and second through bores spaced apart longitudinally of the scraper which extend into openings accessible from the upper surface of the upper coupling piece; lower coupling pieces disposed beneath the end regions of the scraper, each lower coupling piece engaging snugly within the pocket of the associated scraper end region, each lower coupling piece having first and second upstanding threaded pins spaced apart longitudinally of the scraper to correspond with and engage through the first and second bores of the associated upper coupling piece, respectively, the first pin also engaging through the bore in the web wall of the associated scraper end region; means on the facing surfaces of the upper and lower coupling pieces to provide beds for receiving horizontal links of a pair of chains of the assembly; and nuts engaged with the threaded pins and locating in the openings in the upper surface of the associated upper coupling piece to clamp the unit to said chains.

2. A unit according to claim 1, wherein each end region of the scraper has a bevelled end face and each lower coupling piece has a complementary bevelled face which interengages with the end face of the scraper end region.

3. A unit according to claim 1, wherein the scraper and the coupling pieces are each manufactured as a one-piece drop-forging.

4. A unit according to claim 1, wherein each end region of the scraper has stepped lateral shoulders which receive ribs of the upper coupling piece, the shoulders and ribs constituting said projections and recesses.

5. A unit according to claim 1, wherein each scraper end region has a plurality of inclined flank surfaces which define a recess which is trapezoidal in plan view.

6. A unit according to claim 1, wherein the interengaging projections and recesses comprise shouldered recesses at the sides of each web wall and ribs at the sides of each upper coupling piece which engage therewith.

7. A unit according to claim 1, wherein the first and second pins of each lower coupling piece have cross-sections of different size with the first pin being the larger.

8. A unit according to claim 1, wherein the flank surface of each scraper end region is inclined in relation to the associated web wall.

9. In a scraper unit for a scraper-chain assembly of a conveyor, said unit have an elongate scraper extending transversally between a pair of chains, apparatus for connecting each end region of said scraper to one of said chains, said apparatus comprising: an upwardly facing shaped recess and a downwardly facing pocket in said end region, upper and lower vertically aligned separable coupling pieces received respectively in said recess and said pocket, said coupling pieces having inboard portions suitably configured and arranged to grip said end region therebetween and having outboard portions suitably configured and arranged to grip a chain link of the said one of said chains therebetween, a bore in said end region, first means extending through said bore for detachably interconnecting the inboard portions of said coupling pieces to each other and to said end region, and second means extending through said chain link for detachably interconnecting the outboard portions of said coupling pieces to each other and to the said one of said chains.

10. The apparatus of claim 9 wherein said first and second means comprise integral projections on one of said coupling pieces.

* * * * *